United States Patent
Kamiadakis et al.

(10) Patent No.: US 6,332,593 B1
(45) Date of Patent: Dec. 25, 2001

(54) METHOD AND APPARATUS FOR REDUCING TURBULENT DRAG

(75) Inventors: George Em Kamiadakis, Newton; Yiging Du, Bellevue, both of MA (US)

(73) Assignee: Brown University Research Foundation, Providence, RI (US)

(*) Notice: Subject to any disclaimer, the term of this patent is extended or adjusted under 35 U.S.C. 154(b) by 0 days.

(21) Appl. No.: 09/505,270

(22) Filed: Feb. 16, 2000

(51) Int. Cl.[7] .................................................. B64C 21/00
(52) U.S. Cl. ............................................ 244/204; 244/130
(58) Field of Search .................................. 244/150, 205, 244/204

(56) References Cited

U.S. PATENT DOCUMENTS

| | | | |
|---|---|---|---|
| 4,516,747 | * 5/1985 | Lurz | 244/204 |
| 5,273,465 | 12/1993 | Meng | 440/6 |
| 5,320,309 | 6/1994 | Nosenchuck et al. | 244/205 |
| 5,437,421 | 8/1995 | Nosenchuck et al. | 244/205 |
| 5,791,275 | 8/1998 | Bandyopadhyay | 114/67 |
| 5,803,409 | 9/1998 | Keefe | 244/206 |

\* cited by examiner

Primary Examiner—Peter M. Poon
Assistant Examiner—Timothy D. Collins
(74) Attorney, Agent, or Firm—Ropes & Gray

(57) ABSTRACT

The systems and methods of the invention include systems and techniques for controlling a turbulent boundary layer flow with a transverse traveling wave, oscillating at certain selected frequencies, amplitudes and wavelengths, to provide substantial reductions of drag. To this end, the systems and processes can include a boundary layer control system having an object with at least one surface exposed to a medium flowing over the surface. A plurality of excitation elements may be arranged on the surface and these elements are capable of exciting a traveling wave force field in a span-wise direction that is substantially parallel to the surface and perpendicular to direction of the flow. A first component of the traveling wave force field in the span-wise direction is substantially greater than a second component of the traveling wave force field, that is substantially perpendicular to the span-wise direction.

12 Claims, 6 Drawing Sheets

METHOD AND APPARATUS FOR REDUCING TURBULENT DRAG

STATEMENT REGARDING FEDERALLY SPONSORED RESEARCH AND DEVELOPMENT

This invention was made with government support under Contract Number N66604-98-C-1266, awarded by the Naval Undersea Warfare Center. The Government has certain rights in the invention.

FIELD OF THE INVENTION

The invention relates to an apparatus and a method of reducing turbulent drag on an object moving relative to a fluid.

BACKGROUND OF THE INVENTION

Several approaches have been proposed to reduce drag caused by turbulence and boundary layer flow around an object moving relative to a fluid. Drag can be reduced by appropriately shaping the object to minimize the formation of vortices, for example, by installing the so-called riblets. Drag may also be reduced by actively controlling vortex formation in the boundary layer by applying electromagnetic fields, by heating the surface, by generating micro-bubbles, by suctioning off the inner boundary layer and/or by injecting a high-velocity flow into the boundary layer. Some of the active control measures require the fluid to be electrically conducting, such as an electrolyte, sea water and an ionized gas, whereas other active control measures require complex control mechanisms and/or may use more energy in operation than is being saved through the drag reduction.

It would therefore be desirable to provide a more energy-efficient method for reducing the drag on an object moving through a fluid, and an apparatus using the method.

SUMMARY OF THE INVENTION

According to one aspect of the invention, drag can be reduced by producing along a major surface of the object a traveling wave force traveling in the span-wise direction, i.e., in a direction parallel to the major surface and perpendicular to the flow direction. This approach does not require a closed loop control mechanism and is therefore robust and cost-effective.

According to another aspect of the invention, the force may be produced by an arrangement of magnets having alternating poles in the flow direction and electrodes producing an electric field substantially perpendicular to the flow direction. The electrode spacing can be selected essentially independent of the optimum wavelength of the traveling wave for reducing the turbulence by applying a suitable pulse sequence to the electrodes.

According to yet another aspect of the invention, the force may be produced by an array of actuators, for example, mechanically deformable tiles disposed on the surface. The tiles may be formed of a resilient material or of a so-called "smart" material which has a shape memory effect and does not demand a continuous activation, thereby conserving energy.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN EMBODIMENTS

The description below pertains to several possible embodiments of the invention. However, it is understood that many variations of the systems and methods described herein may be envisioned by one skilled in the art, and such variations and improvements are intended to fall within the scope of the invention. Accordingly, the invention is not to be limited to the following illustrative embodiments.

The systems and methods disclosed herein relate to turbulent drag reduction through formation of traveling wave force fields. The traveling wave drag reduction systems and methods described herein may be employed for reducing drag arising from the effect of fluids or gases. In addition, the traveling wave force fields employed by the systems and methods described herein may be produced by any suitable techniques, including, but not limited to, those described techniques described below, as well as other techniques as acoustic waves, flow injection and suction. The drag reduction systems described herein can provide a more effective and energy-efficient reduction of turbulent drag than systems employing stationary or oscillatory force fields.

Figure 1:
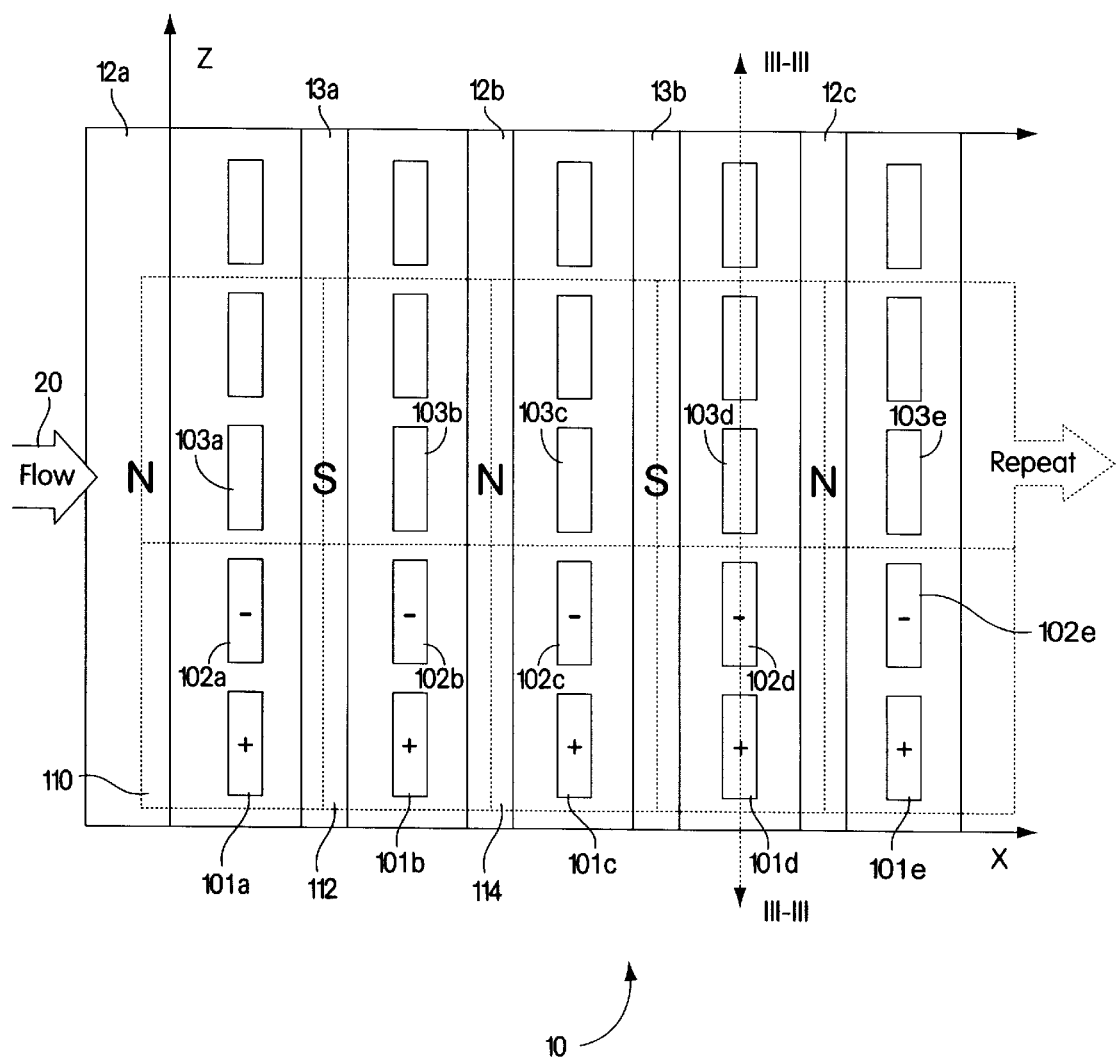
FIG. 1 is a schematic top view of a first embodiment of a tile array according to the invention.

FIG. 1 is a schematic top view of a surface 10 of an object populated with an array of controllable electromagnetic tiles 110, 112, 114, . . . A plurality of magnets 12a, 12b, 12c having, for example, a North pole near the surface 10 alternate in the flow direction 20 with magnets 13a, 13b having a South pole near the surface 10. Near the surface 10 of the object, the magnetic field lines (not shown) extend essentially perpendicular to the surface and form characteristic dipole field patterns known in the art. The magnets 12a, 13a, . . . may be permanent magnets having a magnetic field strength of, for example, 0.2 to 0.4 Tesla.

Electrodes 101a, 102a, 103a are arranged between the magnets 12a and 13a. This pattern repeats in the flow direction 20, with electrodes 101b, 102b, 103b arranged between the magnets 13a and 12b, and so on. A controlled electric voltage can be applied separately to each electrode, as will be described below.

Figure 2A:
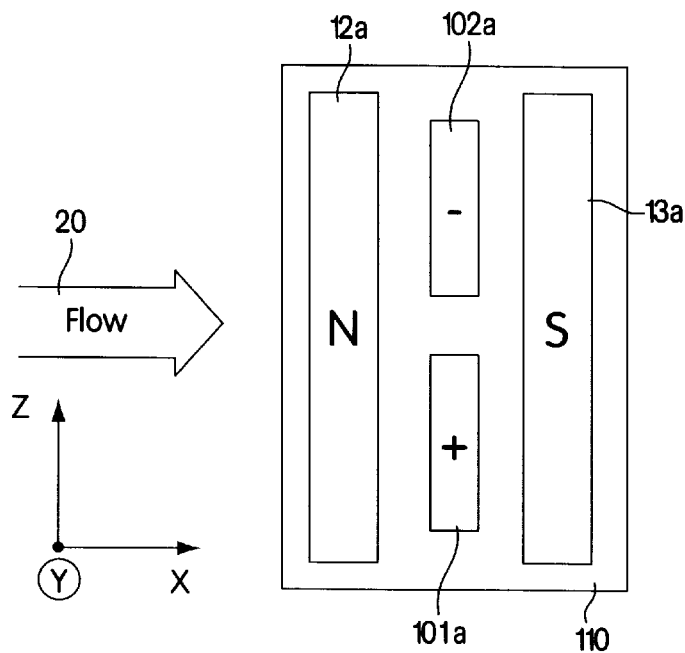
FIGS. 2A and 2B are schematic top views of different embodiments of a tile of the tile array of FIG. 1.
Figure 2B:
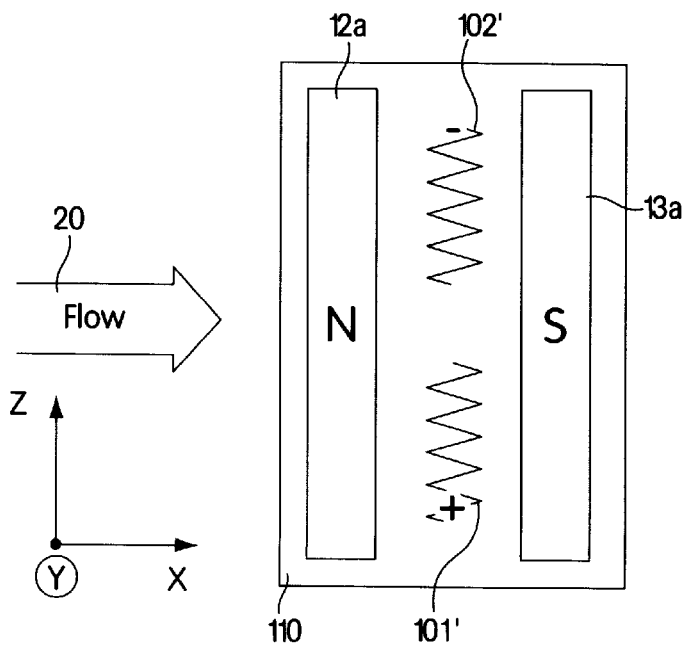

Referring now to FIGS. 2A and 2B, the shape of the electrodes determines the Lorentz force $\vec{L}$. The Lorentz force $\vec{L}$ is proportional to the vector product of the electric field $\vec{E}$ produced by the electrodes 101a, 102a with the magnetic field $\vec{H}$ produced by the magnets 12a, 13a:

$$\vec{L} = \vec{H} \otimes \vec{E}$$

Although near the boundary layer the magnetic field lines of H are oriented substantially in the respective N-S directions perpendicular to the surface 10 of the object and the electric field E extends substantially parallel to the surface of the object between the + electrode 101a and the − electrode 102a, components of the E and H fields in other directions are introduced away from the surface 10 which produce a three-dimensional Lorentz force $$\vec{L} = \begin{pmatrix} L_x \\ L_y \\ L_z \end{pmatrix}$$

wherein $L_x$ is the force component along the flow, $L_y$ is the force component perpendicular to the surface of the object, i.e., the array, and $L_z$ is the force component perpendicular to both the flow and the surface of the object.

The design of the electrodes according to the present invention illustrated in FIGS. 2A and 2B attempts to maximize the force ratio $L_z/L_x$ or coequally minimize the force ratio $L_{x/Lz}$. According to one embodiment, the electrodes may have an elongated shape in the span-wise direction and a narrow shape in the flow direction to produce a force field L having a large component in the span-wise direction (z-direction), i.e., parallel to the surface and perpendicular to the flow direction. The electrodes may be in the form of conductive plates 101a, 102a, as shown in FIG. 2A, or in the form of an elongated wire pattern 101', 102', as shown in FIG. 2B.

Turbulent drag may be reduced by generating a traveling wave in the span-wise direction. As mentioned above, the magnets 12a, 13a, 12b, 13b, . . . may be permanent magnets producing a constant magnetic field, which may be between 0.2 and 0.4 Tesla. The electrodes may be switched on and off periodically, for example, with the following exemplary switching pattern. Referring back to FIG. 1, a positive voltage may be applied for a brief time, such as for example about 1 to 100 msecs, and more particularly about 50 msec, to the electrodes 101a, 101b, . . . , 101e in a first row of electrodes, and a negative voltage may be applied to the electrodes 102a, 102b, . . . , 102e in a second row above the first row. In other words, all electrodes in the same row parallel to the flow direction have an identical electrical potential. Thereafter, a positive voltage may be applied to the electrodes 102a, 102b, . . . , 102e in the second row, and a negative voltage may be applied to the electrodes 103a, 103b, . . . , 103e in the third row above the second row, and so on. With the magnets placed perpendicular to the flow direction, electrodes producing a Lorentz force L with a large $L_z$ component have preferentially a large aspect ratio of approximately 10, with the electrode length being about at least 10 times greater than the electrode width. The actual length and width of the electrodes may depend on the system parameters, as characterized, for example, by the Reynolds number. For a Reynolds number of 150 (based on the wall shear velocity), an exemplary electrode has a length of approximately 10 mm and a width of approximately 1 mm. The span-wise separation between electrodes in the z-direction is approximately 5 mm. The time interval T for switching the electrodes between the different adjacent rows with the exemplary electrode spacing and electrode dimensions is approximately 0.1 sec, corresponding to a frequency of 10 Hz. The pulse repetition rate depends on the electrode configurations and increases, for example, with increasing spacing of the electrodes in the z-direction, as discussed below.

The size of the electrodes determines the penetration depth, A, of the Lorentz force component $L_y$ in the y-direction normal to the surface of the object. A simulation suggests that an effective range of $L_z$ of approximately 5 to 10 viscous length units is sufficient to suppress boundary layer turbulence and thereby reduce drag. In practice, Δ, will depend on the Reynolds number of the system. Typical values for Δ for the exemplary electrode spacing operating in water are between 1 and 10 mm.

The electrodes of the boundary layer control system of the invention energized in the afore described pattern produce a traveling wave in the z-direction with a characteristic wavelength $\lambda_z$. The phase velocity of this wave in the z-direction is typically about one third of the free stream velocity. The traveling wave produces a force field oriented predominantly along the span-wise z-direction with a force component $$F_z = I * e^{-y/\Delta} * \sin\left(\frac{2\pi}{\lambda_z}z - \frac{2\pi}{T}t\right)$$

wherein I is the excitation amplitude, $\lambda_z$ is the wavelength along the span (z-direction), and T is the excitation time period. The traveling wave travels with a phase velocity $V_z$, wherein $$V_z = \frac{\lambda_z}{T}.$$

Figure 3:
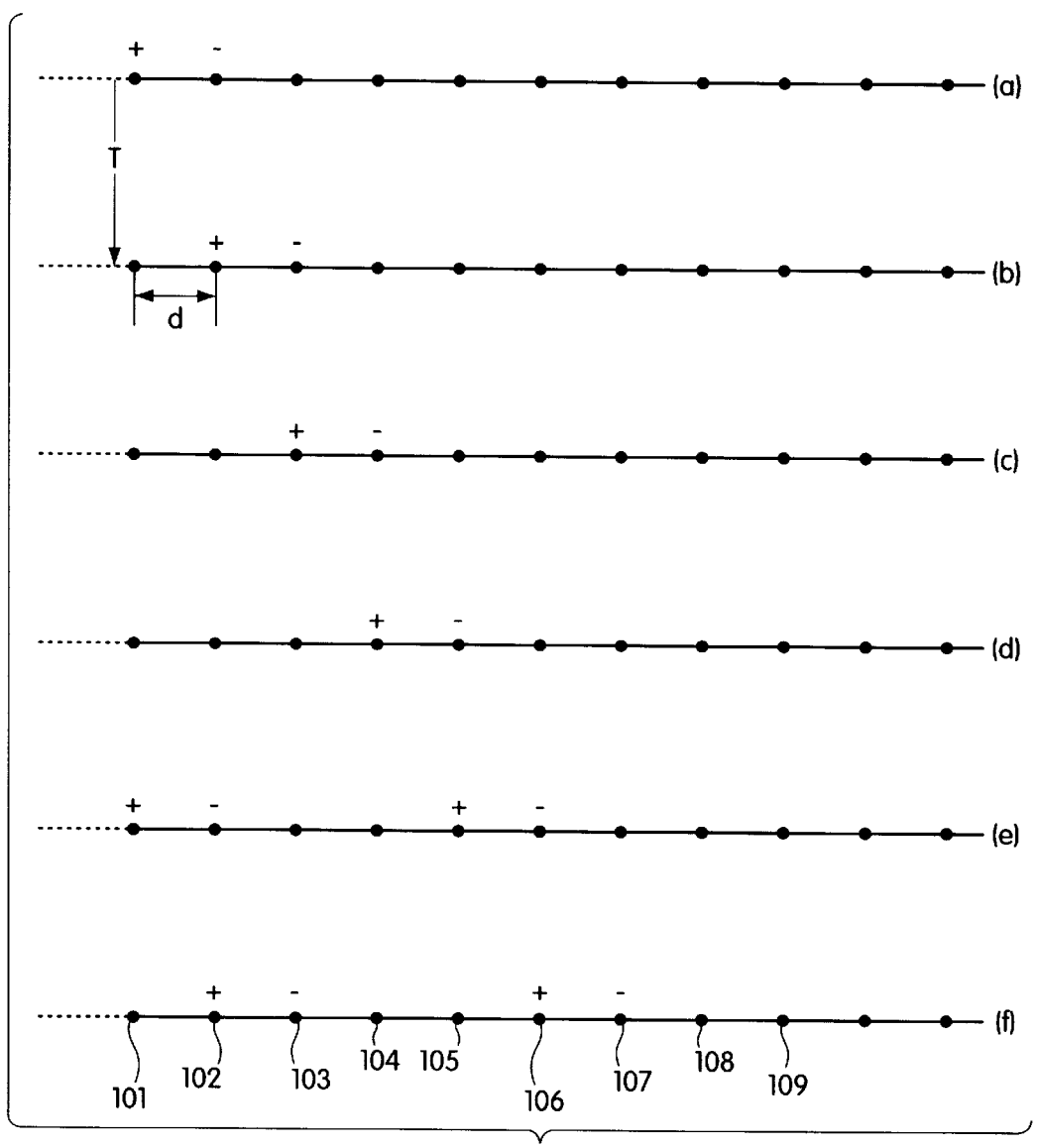
FIG. 3 shows excitation of a traveling wave.

Referring now to FIG. 3, each point 101, 102, . . . , 109 on lines (a) to (f) represents a row as viewed in cross section of FIG. 1 along the line III—III. The different lines (a) to (f) represent different times, which in the illustrated example are selected to be T, 2T, 3T, and so on, wherein T is the excitation time period defined above. For example, row 101 represents electrodes 101a, 101b, . . . , 101e; row 102 represents electrodes 102a, 102b, . . . , 102e; and so on. All tiles in the same row are assumed to have the same electrical potential. As seen in FIG. 3, the excitation travels with a velocity d/T, corresponding to the phase velocity $V_z$ of the traveling wave. In the illustrated example, each row is excited with a time period 4*T or a frequency 1/(4*T).

A simulation suggests that the phase velocity $V_z$ should be greater than one third of the free-stream velocity. In addition, the electrodes should be sized to produce a penetration depth A sufficient to reduce drag; on the other hand, if A becomes too large, turbulent drag may increase again. It should be noted that a traveling wave traveling in the z-direction is quite different from an oscillatory flow in the z-direction. An oscillatory flow can be thought of as a flow that has half a period going in one direction and the other half in the other direction. With an oscillatory flow, the nodes occur at the same location in the z-direction, whereas traveling waves do not have stationary nodes.

From the efficiency point of view, it is advantageous to produce a traveling wave by actuators that are widely spaced apart, since less energy is required to activate the actuators. However, such widely spaced actuators can only define the traveling wave in a coarse and approximate fashion. Simulations have shown that the excitation frequency should increase superlinearly with the electrode spacing. In other words, the excitation frequency of widely-spaced actuators should be higher than the linearly scaled frequency, making the "effective" wavelength shorter.

Turbulence control methods based on Lorentz forces are effective mainly in electrically conducting fluids. However, other methods, such as mechanical actuation, flow injection or suction, can be used to produce traveling wave force fields to reduce drag.

Figure 4:
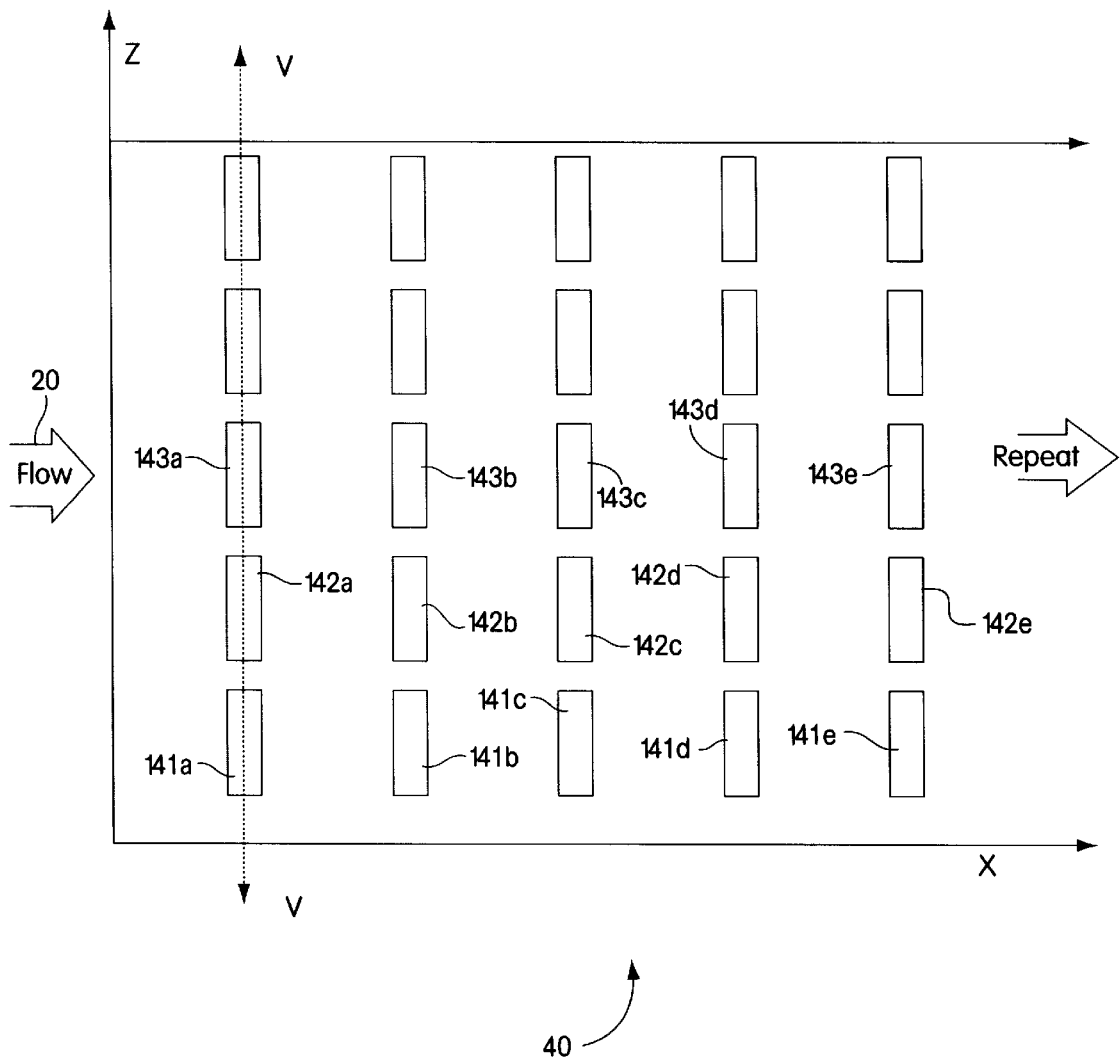
FIG. 4 is a schematic functional circuit diagram of the tile array of FIG. 1 viewed along the z-direction.

Referring now to FIG. 4, according to another embodiment of the invention, a surface 40 of an object populated with an array of controllable actuators 141a, 141b, ..., 142a, 142b, and so on. As discussed above with reference to the electrode configuration of FIG. 1, the actuators of successive rows may be actuated sequentially, with the actuators 141a, 141b, 141c, ... of a first row actuated first, followed by the actuators 142a, 142b, 142c, ... of a second row, and so on, thereby producing a traveling wave force field propagating span-wise in the z-direction. Other actuation sequences may also be considered as long as the condition of the force ratio Lx/Lz<<1 is satisfied, as explained above. It should be noted that this type of actuation does not require magnets and may therefore also operate with non-conducting fluids.

Figure 5:
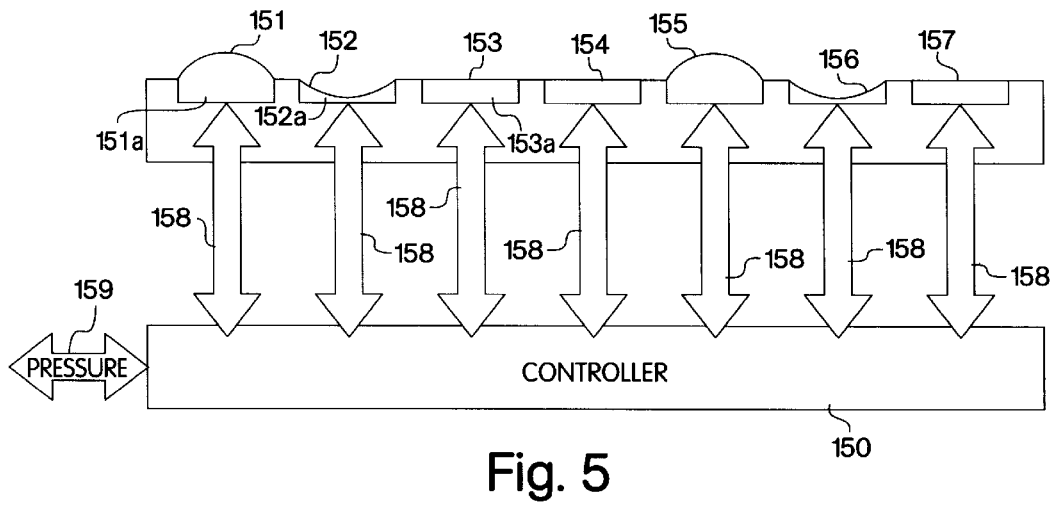
FIG. 5 is a schematic top view of a second embodiment of a tile array according to the invention.

FIG. 5 shows a cross section of different rows taken along the line V—V of FIG. 4 taken at an exemplary time corresponding to curve (e) of FIG. 3. Exemplary actuators may be membranes 151, 152, 153, ..., 157 which can be deformed through application of a positive and/or negative pressure 151a, 152a, ..., 157a on one side of the respective membrane opposite the fluid flow that would be directed outward from the page. The pressure may be controlled through a pressure/flow controller 150 connected to respective pressure and vacuum lines 158. The traveling wave produced by the embodiment of FIG. 5 is similar to that illustrated in FIG. 3, with the positive potential (+) corresponding, for example, to a convex shape of the membranes 151, 155 and the negative potential (−) corresponding to a concave shape of the membranes 152, 156.

Figure 6:
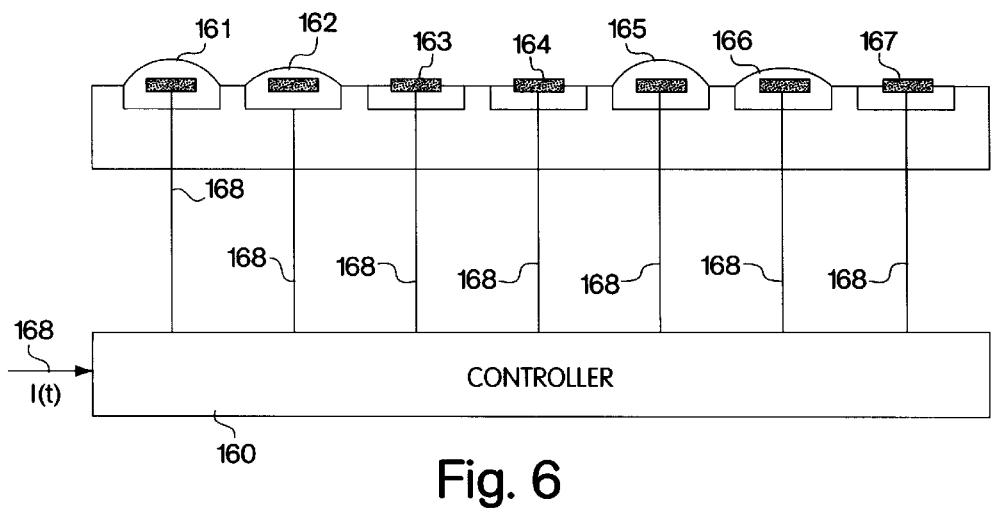
FIG. 6 is a schematic top view of a third embodiment of a tile array according to the invention.

FIG. 6 also shows a cross section of different rows taken along the line V—V of FIG. 4 taken at an exemplary time corresponding to curve (e) of FIG. 3. In this embodiment, the membranes may be deformed, for example, only in a convex shape or a concave shape (not shown). The selected material may deform under external stimulation, such as electric and/or magnetic fields, heat and the like. Other suitable materials may be so-called "smart" materials which, once actuated, retain their shape without further actuation. An example of a surface array made of a heat-deformable material is shown in FIG. 6. The traveling wave produced by the embodiment of FIG. 6 is similar to that illustrated in FIG. 3, with the dipole field produced between the positive (+) and negative (−) potential corresponding, for example, to a convex shape of the membrane 161, 162, 165, 166. The excitation strength may be adjusted by controlling the heater energy using a controller 160 for adjusting the heater current 168 supplied to the individual heater elements.

| Actuation | Excitation amplitude | $T^+$ | Drag reduction (%) |
| --- | --- | --- | --- |
| Traveling wave | 1 | 100 | Increase |
| Traveling wave | 1 | 50 | 30 (Max) |
| Traveling wave | 1 | 25 | 15 |
| Oscillatory flow | 1 | 100 | 30 (Max) |

The above numbers are representative of electromagnetic drag reduction via Lorentz force traveling waves. Also, simulations with larger penetration lengths (but smaller than 20–30 wall units) show that an even larger drag reduction can be projected to be about 70%.

Figure 7:
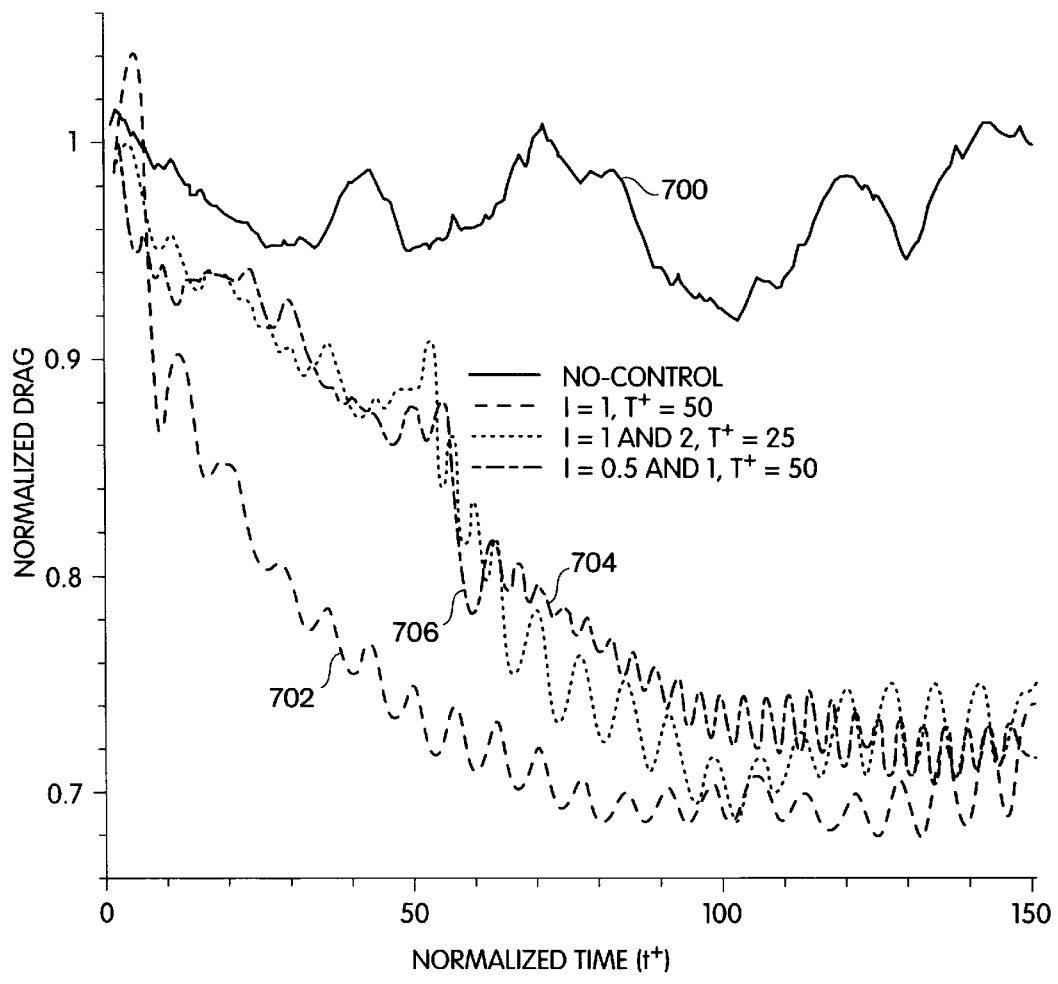
FIG. 7 is a schematic diagram of the reduction of drag force as a function of time for various excitation amplitudes and time periods.

Referring now to FIG. 7, the normalized drag is plotted as a function of normalized time for different excitation amplitudes and excitation time periods (inverse excitation frequency). The normalized units, such as $T^+$, $\lambda^+$, $\Delta^+$, are designated with a + sign and computed by dividing, for example, the actual velocity by $\sqrt{(\tau_w/\rho)}$, so that the result is valid for flow conditions represented by the same Reynolds number, with $\tau_w$ being the average shear stress in the flow direction and $\rho$ the density of the fluid. The curve 700 represents the response of the simulated system without external control. As seen from FIG. 7, the time-averaged normalized drag is essentially constant. Curve 702 represents the condition I=1 and $T^+$=50 in the Table, showing that the normalized drag is reduced by approximately 30% as a result of the application of a span-wise traveling wave force field.

As also shown in FIG. 7, the curve 706 corresponding to $T^+$=50 and I=0.5 is very close to the curve 704 corresponding to $T^+$=25 and I=1, wherein both curves have the same energy $\int (I*dt)=I*T^+$=25. To further test the hypothesis that the reduction in the drag depends on the total energy supplied by the traveling wave force field, at the normalized time $t^+$=50 an initial condition of I=2 and $T^+$=25 was set for curve 704 and likewise, an initial condition of I=1 and $T^+$=50 was set for curve 706, both corresponding to an energy of $I*T^+$=50 at $t^+$=50, which is identical to that of curve 702 which shows a drag reduction of approximately 30% for $t^+$ greater than approximately 100.

After $t^+$=50, both curves 704 and 706 show at the beginning a sudden decrease in the normalized drag. Both curves 704 and 706 then track each other closely towards the lowest point in the plot, approaching the curve 702 obtained with I=1 and $T^+$=50. It should be noted, however, that not all combinations of (I, $T^+$) result in a drag reduction. For example, I=0.25 and $T^+$=200 resulted in a drag increase. A traveling wave with a time period of $T^+$=200 has a comparatively low frequency, since the frequency is inversely proportional to the time period $T^+$. As described above, the phase speed $V_z$ of the traveling wave is equal to $\lambda_z/T$ (or $\lambda_z^+/T^+$), and should be greater than, for example, one third of the free steam velocity in order to effectively suppress turbulence. Consequently, for large values of $T^+$, $V_z$ will become too small to be effective.

The computational domain used in the simulation of FIG. 7 is a channel, with the force acting on a lower wall. The following examples were simulated using the following parameters:

$\Delta^+=u^*\Delta/\nu=5$ (in wall units), wherein $u^*$ is the wall shear velocity, and $\nu$ is the kinematic viscosity;

Reynolds number: $Re^* \approx 150$ (based on the wall shear velocity $u^*$ and the channel half-width); and the size of the computational domain is $L_x$=2100; $L_y$=300; and $L_z$=840 (in wall units).

A "wall unit" $\Delta^+$ is a dimensionless number used by those skilled in the art to express distance when phenomena being measured relate to the flow conditions along a surface.

Although not to be bound by theory, traveling wave methods appear to be substantially more energy-efficient than methods based on continuous excitation or oscillatory wave excitation for, inter alia, the following reasons:

Instead of activating and energizing a large number of, or possibly all, electrodes (for Lorentz force fields) or actuators (for general force fields) in the span-wise direction, as is required to produce oscillatory flow, a smaller number of proximate electrodes or actuators need to be actuated sequentially across the span. As a result, the overall energy input is estimated to be only a small fraction (in the order of 5%) of the net drag reduction gain.

While the invention has been disclosed in connection with certain illustrated embodiments shown and described in detail, various modifications and improvements thereon will become readily apparent to those skilled in the art. Moreover, it will be apparent from the above description that the systems and methods of the invention have numerous applications including drag reduction systems suitable for use in diverse commercial and military applications. For example, the systems and methods described herein may be employed for reducing drag in moving vehicles and devices, including cars, airplanes, ships, submarines, and propellers, thereby reducing fuel consumption. Additionally, the systems and methods described herein may be employed to increase the effective range of torpedoes rockets, and missiles. Similarly, the systems and methods of the invention may be employed for reducing noise and vibrations, as well as fatigue, and for providing surfaces, such as pipe walls and sails that allow fluids to flow more efficiently over the surface of the wall or sail. Accordingly, the spirit and scope of the present invention is to be limited only by the following claims.

We claim:

1. A boundary layer control system comprising:

an object having at least one surface exposed to a medium flowing over said surface in a flow direction, and a plurality of excitation elements arranged on said surface and capable of exciting a traveling wave force field in a span-wise direction substantially parallel to the surface and perpendicular to the flow direction, with a first component of the traveling wave force field in the span-wise direction being substantially greater than a second component of the traveling wave force field substantially perpendicular to the span-wise direction.

2. The boundary layer control system according to claim 1, wherein said plurality of excitation elements comprises:

a plurality of magnets having magnetic poles alternating in the flow direction, a plurality of electrodes disposed between respective pairs of alternating magnetic poles, and a switch connected to said electrodes for selectively applying a voltage to selected ones of the plurality of electrodes to produce said traveling wave force field.

3. The boundary layer control system according to claim 1, wherein said plurality of excitation elements comprises: actuators having deformable surface regions deforming in response to control signals, said surface regions cooperatively exciting the traveling wave force field.

4. The boundary layer control system according to claim 1, wherein said traveling wave force field has a propagation velocity in the span-wise direction which is greater than approximately one third of a flow velocity of the medium.

5. The boundary layer control system according to claim 2, wherein a length of the electrodes in the span-wise direction is greater than a width of the electrodes in the flow direction.

6. The boundary layer control system according to claim 5, wherein the length of the electrodes in the span-wise direction is at least five times greater than the width of the electrodes in the flow direction.

7. A method of controlling a boundary layer, comprising:

exposing a surface of an object to a medium flowing over said surface in a flow direction, and exciting a traveling wave force field in a span-wise direction substantially parallel to the surface and perpendicular to the flow direction, wherein a first component of the traveling wave force field in the span-wise direction is substantially greater than a second component of the traveling wave force field substantially perpendicular to the span-wise direction.

8. The method of claims 7, wherein exposing a surface of an object to a medium flow, includes exposing the surface of the object to a flow of gas.

9. The method of claims 7, wherein exposing a surface of an object to a medium flow, includes exposing the surface of the object to a flow of liquid.

10. The method of claim 7, wherein exciting a traveling wave force field includes providing a plurality of magnets and electrodes on the surface and operating the plurality of magnets and electrodes to induce a traveling wave force field.

11. The method of claim 7, wherein exciting a traveling wave force field includes providing a plurality of actuators having deformable surface regions and operating the actuators for cooperatively exciting a traveling wave force field.

12. The method of claim 7, further including wherein exciting a traveling wave force field includes employing a multi-phase-electrode-pulsing scheme.

* * * * *

UNITED STATES PATENT AND TRADEMARK OFFICE
CERTIFICATE OF CORRECTION

PATENT NO. : 6,332,593 B1
DATED : December 25, 2001
INVENTOR(S) : George Em Karniadakis and Yiging Du It is certified that error appears in the above-identified patent and that said Letters Patent is hereby corrected as shown below:

Column 1,
Item [75], Inventors: the name "Karniadakis" should read -- Karniadakis --

Signed and Sealed this

Sixteenth Day of April, 2002

*Attest:*

JAMES E. ROGAN
*Attesting Officer*     *Director of the United States Patent and Trademark Office*